3,287,912
PROPELLENT CHARGE FOR SOLID FUEL ROCKETS
Karl-Otto Wehlow, Dusseldorf, and Hans-Dieter Harnau, Gevelsberg, Westphalia, Germany, assignors to Firma Rheinmetall G.m.b.H., Dusseldorf, Germany
Filed July 8, 1963, Ser. No. 293,926
Claims priority, application Germany, June 30, 1962, R 33,039
7 Claims. (Cl. 60—256)

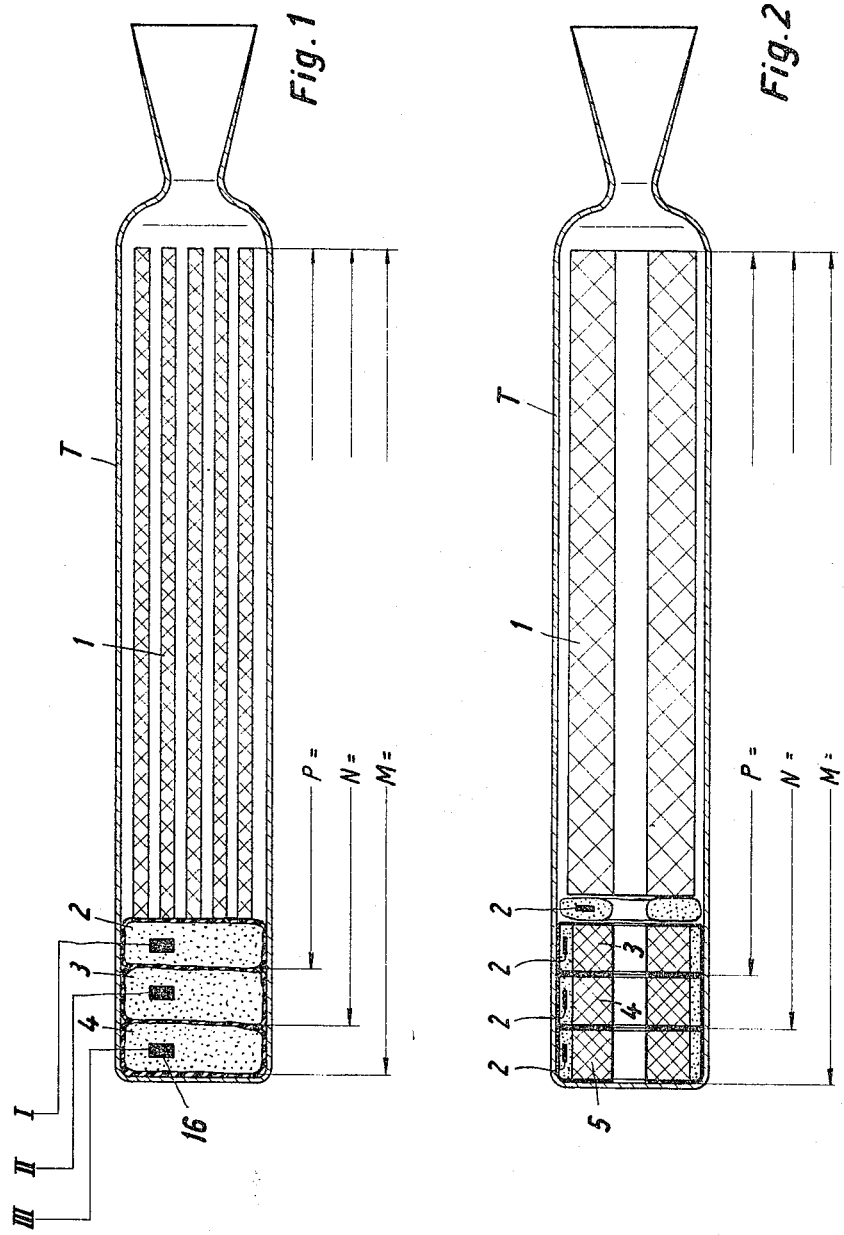

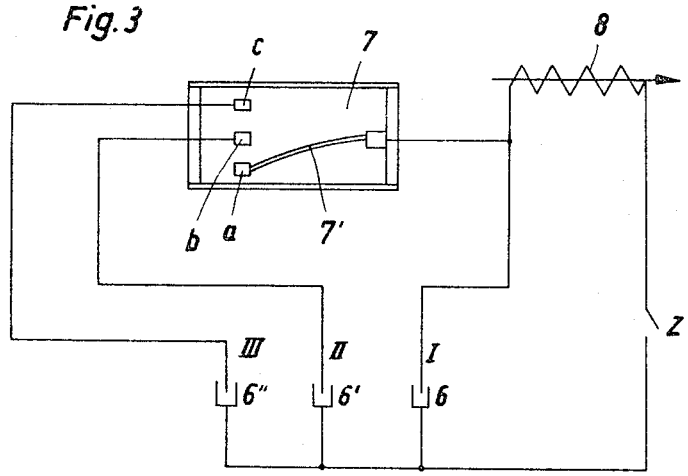
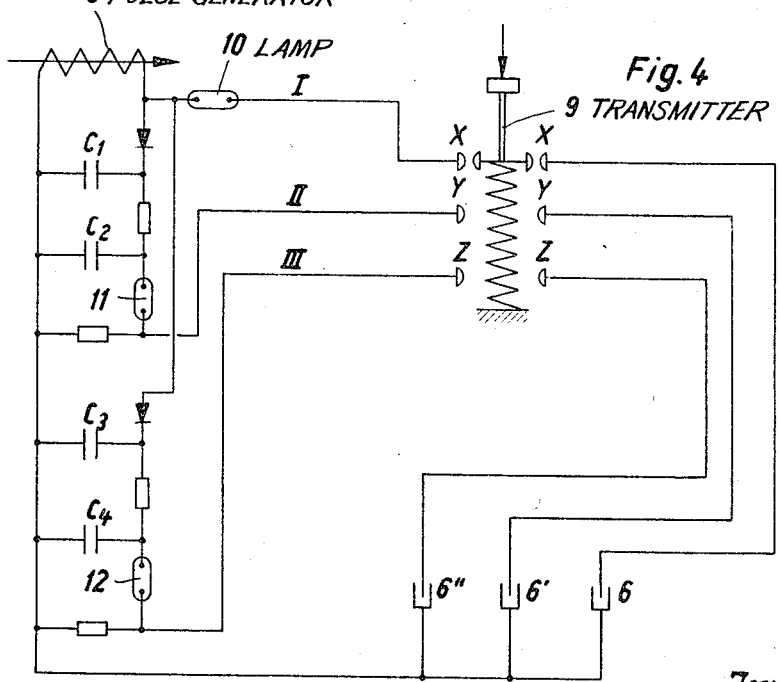

When the propellent charge of a solid fuel rocket is ignited, a certain minimum quantity of heat must be available in order to attain the ignition temperature, this quantity depending on the surface area of the propellent grain, the charging density and the properties of the grain. This quantity of heat is released by burning an igniting charge, which in turn is subject to similar conditions as regards ignition.

Owing to different external surface temperatures assumed by the unburnt propellant charge and the igniting charge, on the one hand, there will be variations in the heat required for obtaining a desired ignition delay time, during which heat exchange between the igniter and the propellent charge takes place, and, furthermore, unfavourable effects are produced by the variable rate at which the grain burns away, which is a function of the pressure in the combustion chamber and of the temperature of the propellent charge. The aggregate result of the two-last-mentioned effects is that at temperatures lower than a reference temperature, there is a slower combustion of the propellent charge, with a lower combustion-chamber pressure and a longer burning time. Consequently, the momentum obtainable also becomes lower. At temperatures higher than the reference temperature, an opposite effect is obtained, that is to say, more rapid combustion, higher combustion-chamber pressure and shorter burning time.

This effect of the temperature gradient is very undesirable, since the combustion chamber must be designed, as regards strength, for the pressure at maximum external temperature and the rocket accordingly exhibits at lower external temperatures a mass ratio less favourable than is necessary and, moreover, develops a smaller momentum. In short-burning rockets, there is frequently the additional complicating design condition of limited maximum burning time.

The present invention makes it possible to compensate the effect of the temperature gradient of a grain with measures pertaining to interior ballistics by electrical methods. This is achieved in that with the propellent charge of the rocket there is associated one or more compensating charges screened from the combustion chamber and which are arranged independently of one another, but in such manner that they can be ignited simultaneously or in succession, and that the propellent charge and the compensating charge are so proportioned that the momentum resulting from the combustion of the main propellent charge and the compensating charge is always the same for all temperature ranges.

The ignition of the compensating charges is effected by means of an electric switch which can be actuated in dependence on various quantities. In the case of control dependent on the external temperature, this actuation can be effected by means of a temperature responsive switch, e.g. bimetallic switch; in the case of control in dependence of the combustion-chamber pressure, by means of a gas-pressure-responsive switch; or in the case of control in dependence on the rise in pressure in the combustion chamber by means of an acceleration-responsive switch.

In this way, depending on external temperature, combustion-chamber pressure or rise in pressure, an appropriate quantity of heat is available for compensation purposes, and, by means of the compensating charge burning either over part of the burning time of the main charge or over the entire burning time of the main charge, the surface of the grain is increased, and thereby the combustion-chamber pressure, in the negative temperature range, while they are reduced in the positive temperature range.

By this means, on the one hand, the influence of the grain temperature on the pressure and burning rate can be compensated and, furthermore, by surface gradations of the compensating charges, with constant total weight of the burning powder, the momentum, and thereby the cut-off velocity of the rocket, can be kept constant.

Two examples of embodiments of the invention are illustrated diagrammatically in the drawing, in which:

FIG. 1 shows a short-burning rocket with two compensating charges,

FIG. 2 shows a long-burning rocket with three compensating charges,

FIG. 3 shows an electric control circuit incorporating a bimetallic switch controlled by the external temperature, FIG. 4 shows an electric circuit incorporating an acceleration switch actuated by the increase in gas pressure.

Figure 5:
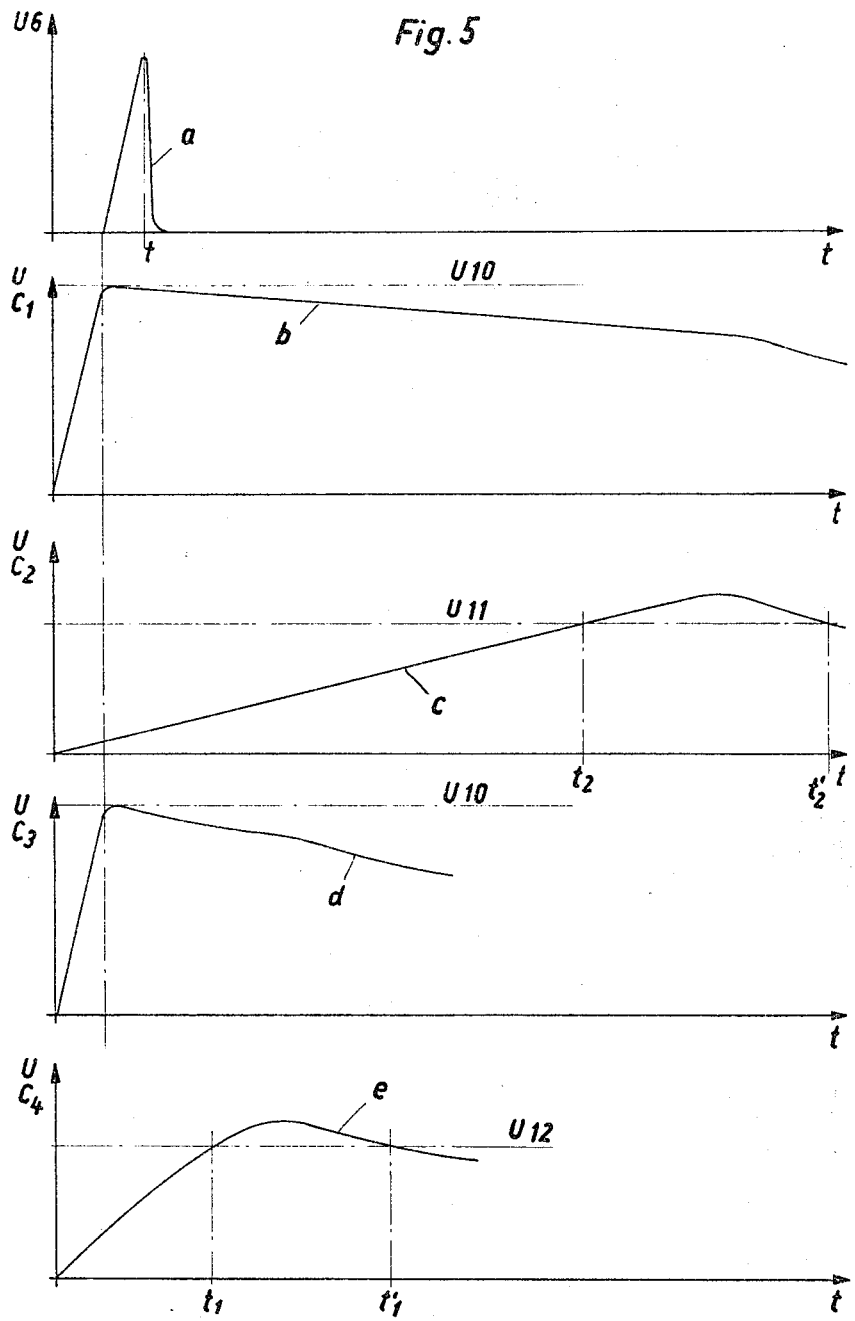
FIG. 5 illustrates the voltage waveforms relating to FIG. 4.

FIG. 1 shows diagrammatically the construction of a short-burning rocket. The rocket T contains, apart from the main propellent charge grain 1, an igniting charge 2 and compensating charges 3 and 4 screened off from the combustion chamber. The rocket is designed for a specific temperature, the normal temperature N. If the rocket is fired within the temperature range, the igniting charge 2, the compensating charge 3 and the main propellent charge are ignited. If the rocket is fired at a higher (positive) temperature (P), the main propellent change is merely ignited by the igniting charge 2. If, on the other hand, the rocket is fired at a lower (negative) temperature (M) than the normal temperature N, then the igniting charge 2, both the compensating charges 3 and 4 and the main propellent charge 1 are ignited. The compensating charges are so screened from one another that ignition of the unignited stages by the powder gases is prevented. The unignited compensating charges remain unburnt in the rocket. To this end, and in order to take up the pressure and accelerating forces occurring, the compensating charge has a suitable screening mass, for example, where the charge is of pulverulent type the containers for the compensating charges are advantageously made of screened elastic material (for example a screening mass in combination with silk gauze, plastic, glass fibre or rubber) and are secured to the bottom of the combustion chamber by means of a mounting. The igniting charge and the compensating charges each have their own priming means 16 (primer capsule, primer screw of the like).

The long-burning rocket shown in FIG. 2 is correspondingly designed. It likewise has a main propellent charge 1 with which a graded igniting charge 2 and the compensating charges 3, 4 and 5 are associated. The dimensioning of the compensating charges is effected according to requirements, for example constant burning time or constant momentum and cut-off velocity or the like. The quantity of compensating charge, type of powder, form of grain or size and form of the grains of the individual stages may vary according to purpose, desired graph characteristic and temperature range.

FIG. 3 shows an electric ignition circuit which is controlled in dependence on the external temperature. Switching is effected by way of a bimetallic switch 7. As shown in FIG. 3, the switch is in the positive temperature switching position $a$, in which only the circuit I is closed by the ignition switch Z. If the external temperature drops, the bimetallic strip 7' straightens and closes the circuit II in parallel with the circuit I by way of a spring contact $b$. This position corresponds to the normal or reference temperature N. When the temperature drops to a negative temperature, the bimetallic strip bends towards the other side and also closes the circuit III in parallel with the circuits I and II by way of a spring contact $c$. In the circuit I there is located, for example, the primer capsule 6 of the igniting charge, so that in the positive temperature range only the igniting charge 2 and the main propellent charge 1 (FIGS. 1 and 2) are ignited. In each of the circuits II and III there is located the primer capsule of a compensating charge, which charges are either ignited simultaneously with the igniting charge or in succession by way of a delay device.

The contacts $b$ and $c$ are adjustable, so that variations of the temperature ranges are possible within certain limits. Fundamentally, the circuit is so constructed that the circuit I is closed without fail by way of the ignition switch 2 even if there is a failure of any structural part in circuits II or III. A pulse generator 8 is provided as source of energy.

FIG. 4 shows the circuit diagram for an ignition circuit controlled by an acceleration amplitude transmitter 9 in dependence on the increase in gas pressure in the combustion chamber. For a better understanding of the circuit diagram, the voltage conditions at the important points of the circuit are illustrated in FIG. 5 in the curves $a$ to $e$.

More particularly, the curves show the following:

(a) the voltage/time relationship at the ignition means 6 of the circuit I, which ignites at the time $t$, (b) the voltage/time relationship at the capacitor C1. The voltage U10 corresponds to the striking voltage of the glow-discharge tube 10, (c) the voltage/time relationship at the capacitor C2. The voltage U11 corresponds to the striking voltage of the glow-discharge tube 11, (d) the voltage/time relationship at the capacitor C3. The voltage U10 corresponds to the striking voltage of the glow-discharge tube 10 (as curve $b$), (e) the voltage/time relationship at the capacitor C4. The voltage U12 corresponds to the striking voltage of the glow-discharge tube 12.

The curves illustrated relate to the switch position shown in FIG. 4. For the purpose of simplification, only the striking voltage of the glow-discharge lamps 10, 11 and 12 is shown, but the ignition circuits are capable of ignition until the extinction voltage of the lamps is reached, which is a certain value lower than the striking voltage.

It can be seen from the curves that the ignition means 6' and 6" of the circuits II and III can be ignited by way of the switch only when the striking voltage of the associated glow-discharge tube 11 or 12 is exceeded. (Time intervals $t1$–$t1'$ and $t2$–$t2'$.)

Depending on the degree of acceleration, the appropriate compensating charges are ignited as follows: When the pulse generator 8 employed, for example, as source of energy, is actuated it charges the capacitors C1 and C3 up to the striking voltage U10 of the tube 10 (FIG. 5, curves $b$ and $d$). The ignition circuit I is so designed that the igniting charge is not ignited by the glow-discharge tube 10 (curve $a$) until the storage capacitors C1 and C3 for the circuits II and III are charged. The charging of the ignition capacitors C2 and C4 is delayed relative to the charging of the storage condensers by way of resistances, so that ignition is possible in the circuit II only during the time $t2$ to $t2'$ (curve $c$) and in the circuit III only during the time $t1$ to $t1'$ (curve $e$). The time $t1$ is less than $t2$.

After operation of the ignition means 6, the pressure (the acceleration) can increase with varying rapidity. If the acceleration increases so markedly that the switch 9 reaches the position $z$ from the basic position $x$—$x$ in the time $t1$ to $t1'$ (curve $e$), then the weak compensating charge is ignited by operation of the igniter 6". After the pressure (acceleration) has diminished, the switch returns by way of position $y$ to the initial position, the ignition circuit II not operating since the time range $t2$ to $t2'$ has long since been exceeded. If, on the other hand, the pressure rise (acceleration) is so small that the switch reaches the position $y$ only after a time $t2$ to $t2'$, then the strong compensating charge is ignited by the igniter 6'. A subsequent operation of the ignition circuit III is not possible since the time $t1$ to $t1'$ has already been exceeded.

What is claimed is:

1. A solid fuel rocket comprising an elongated container enclosed at one end, a combustion chamber, a nozzle connected to the open end of said container and communicating with said combustion chamber, a main solid fuel charge disposed within said combustion chamber and having a burning rate dependent upon variations in external ambient temperature assumed by the unburnt fuel and upon variations in combustion chamber pressure, said main fuel charge producing a predetermined propulsion momentum at a reference ambient temperature and a reference combustion chamber pressure and lower propulsion momentum at lower ambient temperatures and combustion chamber pressures, means for igniting said main fuel charge, at least one auxiliary solid fuel charge disposed within said combustion chamber and isolated from said main fuel charge, means for igniting said auxiliary fuel charge independently of said first mentioned igniting means, and switching means for said second mentioned igniting means responsive to at least one of said variations when the variation would cause the propulsion momentum generated by said main fuel charge to be lower than said predetermined propulsion momentum, said switching means including a bimetallic element controlled by said external ambient temperature, upon ignition said auxiliary fuel charge being capable of generating at least during a substantial part of the burning time of said main fuel charge an auxiliary propulsion momentum whereby the combined auxiliary propulsion momentum and lower main propulsion momentum are substantially equal to said predetermined propulsion momentum.

2. A solid fuel rocket comprising an elongated container enclosed at one end, a combustion chamber, a nozzle connected to the open end of said container and communicating with said combustion chamber, a main solid fuel charge disposed within said combustion chamber and having a burning rate dependent upon variations in external ambient temperature assumed by the unburnt fuel and upon variations in combustion chamber pressure, said main fuel charge producing a predetermined propulsion momentum at a reference ambient temperature and a reference combustion chamber pressure and lower propulsion momentums at lower ambient temperatures and combustion chamber pressures, means for igniting said main fuel charge, at least one auxiliary solid fuel charge disposed within said combustion chamber and isolated from said main fuel charge, means for igniting said auxiliary fuel charge independently of said first mentioned igniting means, and switching means for said second mentioned igniting means responsive to at least one of said variations when the variation would cause the propulsion momentum generated by said main fuel charge to be lower than said predetermined propulsion momentum, said switching means including an acceleration switch controlled by the rocket acceleration which corresponds to the rise in gas pressure in said combustion chamber, upon ignition said auxiliary fuel charge being capable of generating at least during a substantial part of the burning time of said main fuel charge an auxiliary propulsion momentum whereby the combined auxiliary propulsion momentum and lower main propulsion momentum are substantially equal to said predetermined propulsion momentum.

3. A solid fuel rocket comprising a combustion chamber with an exhaust nozzle at one end, a main solid fuel charge disposed within said combustion chamber, an igniting charge within said combustion chamber for igniting said main fuel charge, said main fuel charge being capable of ignition only after a predetermined quantity of heat is generated by said igniting charge, the burning rate of said igniting charge being dependent upon the external ambient temperature assumed by the unburnt igniting charge, said igniting charge upon burning producing said predetermined quantity of heat at a reference ambient temperature and lesser quantities of heat at lower ambient temperatures, means for igniting said igniting charge, at least one auxiliary fuel charge isolated from said igniting charge, means for igniting said auxiliary fuel charge independently of said first mentioned igniting means including a bimetallic element, and switching means for said second mentioned igniting means responsive to a ambient temperature lower than said reference ambient temperature, upon ignition said auxiliary fuel charge being capable of generating at least during a substantial part of the burning time of said igniting charge an auxiliary quantity of heat which when combined with the lower quantity of heat generated by said igniting charge substantially equals said predetermined quantity of heat.

4. A solid fuel rocket comprising a combustion chamber with a nozzle at one end, a main solid fuel charge disposed within said combustion chamber, an igniting charge within said combustion chamber for igniting said main fuel charge said main fuel charge being ignited only after a predetermined quantity of heat is generated by said igniting charge and said mean fuel charge having burning rates dependent upon variations in ambient temperature assumed by the unburnt igniting charge and fuel respectively and upon variations in combustion chamber pressure, said igniting charge upon burning producing at a reference ambient temperature said predetermined quantity of heat and said main fuel charge upon burning producing said predetermined propulsion momentum at a reference ambient temperature and a reference combustion chamber pressure, the burning rates of said igniting charge and said main fuel charge respectively decreasing with temperatures and combustion chamber pressures less than said reference temperature and combustion chamber pressure with a resultant quantity of heat and propulsion momentum respectively less than said predetermined quantity of heat and propulsion momentum, means for igniting said igniting charge, at least one auxiliary solid fuel charge disposed within said combustion chamber isolated from said igniting charge and said main fuel charge, means for igniting said auxiliary fuel charge independently of said first mentioned igniting means, switching means for said second mentioned igniting means responsive to ambient temperatures and combustion chamber pressure less than said reference temperature and reference combustion chamber pressure, said switching means including a bimetallic element controlled by said external ambient temperature, said auxiliary fuel charge being capable of generating after ignition at least during a substantial part of the burning time of said main fuel charge an auxiliary quantity of heat and propulsion momentum respectively which when combined with the lesser quantity of heat and lesser propulsion momentum of said igniting charge and said main fuel charge respectively produces a total quantity of heat and propulsion momentum respectively equal to said predetermined quantity of heat and propulsion momentum.

5. A solid fuel rocket comprising a combustion chamber with a nozzle at one end, a main solid fuel charge disposed within said combustion chamber, an igniting charge within said combustion chamber for igniting said main fuel charge said main fuel charge being ignited only after a predetermined quantity of heat is generated by said igniting charge and said main fuel charge having burning rates dependent upon variations in ambient temperature assumed by the unburnt igniting charge and fuel respectively and upon variations in combustion chamber pressure, said igniting charge upon burning producing at a reference ambient temperature said predetermined quantity of heat and said main fuel charge upon burning producing said predetermined propulsion momentum at a reference ambient temperature and a reference combustion chamber pressure, the burning rates of said igniting charge and said main fuel charge respectively decreasing with temperatures and combustion chamber pressures less than said reference temperature and combustion chamber pressure with a resultant quantity of heat and propulsion momentum respectively less than said predetermined quantity of heat and propulsion momentum, means for igniting said igniting charge, at least one auxiliary solid fuel charge disposed within said combustion chamber isolated from said igniting charge and said main fuel charge, means for igniting said auxiliary fuel charge independently of said first mentioned igniting means, switching means for said second mentioned igniting means respective to ambient temperatures and combustion chamber pressures less than said reference temperature and reference combustion chamber pressure, said switching means including an acceleration switch controlled by the rocket acceleration which corresponds to the rise in gas pressure in said combustion chamber, said auxiliary fuel charge being capable of generating after ignition at least during a substantial part of the burning time of said main fuel charge an auxiliary quantity of heat and propulsion momentum respectively which when combined with the lesser quantity of heat and lesser propulsion momentum of said igniting charge and said main fuel charge respectively produces a total quantity of heat and propulsion momentum respectively equal to said predetermined quantity of heat and propulsion momentum.

6. A solid fuel rocket comprising an elongated container enclosed at one end, a combustion chamber within said container, an exhaust nozzle connected to the open end of said container and communicating with said combustion chamber, a main solid fuel charge disposed within said combustion chamber and having a burning rate dependent upon variations in external ambient temperature assumed by the unburnt fuel and upon variations in combustion chamber pressure, at a reference temperature and a reference combustion chamber pressure said main fuel charge upon burning producing a reference quantity of heat and a reference pressure, said burning rate and consequent quantity of heat and pressure decreasing with a decrease in temperature and combustion chamber pressure, means for igniting said main fuel charge, at least one auxiliary solid fuel charge disposed within said combustion chamber isolated from said main fuel charge for ignition purposes, means for igniting said auxiliary fuel charge independently of said first mentioned igniting means, switching means for second mentioned igniting means responsive to ambient temperatures and combustion chamber pressures less than said reference temperature and reference combustion chamber pressure, said switching means including a bimetallic element controlled by said external ambient temperature, said auxiliary fuel charge being capable of generating after ignition at least during a substantial part of the burning time of said main fuel charge an auxiliary quantity of heat and pressure which when combined with the lesser quantity of heat and pressure of said main fuel charge produces a total quantity of heat and pressure equal to said predetermined quantity of heat and pressure.

7. A solid fuel rocket comprising an elongated container enclosed at one end, a combustion chamber within said container, an exhaust nozzle connected to the open end of said container and communicating with said combustion chamber, a main solid fuel charge disposed within said combustion chamber and having a burning rate dependent upon variations in external ambient temperature assumed by the unburnt fuel and upon variations in combustion chamber pressure, at a reference temperature and a reference combustion chamber pressure said main fuel charge upon burning producing a reference quantity of heat and a reference pressure, said burning rate and consequent quantity of heat and pressure decreasing with a decrease in temperature and combustion chamber pressure, means for igniting said main fuel charge, at least one auxiliary solid fuel charge disposed within said combustion chamber isolated from said main fuel charge for ignition purposes, means for igniting said auxiliary fuel charge independently of said first mentioned igniting means, switching means for second mentioned igniting means responsive to ambient temperatures and combustion chamber pressures less than said reference temperature and reference combustion chamber pressure, said switching means including an acceleration switch controlled by the rocket acceleration which corresponds to the rise in gas pressure in said combustion chamber, said auxiliary fuel charge being capable of generating after ignition at least during a substantial part of the burning time of said main fuel charge an auxiliary quantity of heat and pressure which when combined with the lesser quantity of heat and pressure of said main fuel charge produces a total quantity of heat and pressure equal to said predetermined quantity of heat and pressure.

References Cited by the Examiner

UNITED STATES PATENTS

| | | | |
|---|---|---|---|
| 1,550,007 | 8/1925 | Ciraolo | 60—39.82 |
| 2,612,747 | 10/1952 | Skinner | 102—49 X |
| 2,817,951 | 12/1957 | Turner | 60—35.6 |
| 2,917,894 | 12/1959 | Fox | 60—35.6 |
| 2,918,004 | 12/1959 | Denovan et al. | 60—35.6 |
| 2,956,401 | 10/1960 | Kane | 60—39.47 X |
| 3,031,842 | 5/1962 | Ledwith | 60—39.47 |
| 3,066,486 | 12/1962 | Kirshner et al. | 60—39.47 X |
| 3,128,599 | 4/1964 | Carr | 60—35.6 |
| 3,128,600 | 4/1964 | Oldham | 60—35.6 |
| 3,143,853 | 8/1964 | Sobey | 60—35.6 |

MARK NEWMAN, *Primary Examiner.*

SAMUEL FEINBERG, *Examiner.*

V. R. PENDEGRASS, C. R. CROYLE,
*Assistant Examiners.*